(12) United States Patent
Patel

(10) Patent No.: US 10,499,678 B1
(45) Date of Patent: *Dec. 10, 2019

(54) EXTRACTING AND PACKAGING COCONUT WATER BASED PRODUCTS IN AN INERT ATMOSPHERIC ENVIRONMENT

(71) Applicant: Nilang Patel, Mableton, GA (US)

(72) Inventor: Nilang Patel, Mableton, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/024,805

(22) Filed: Jun. 30, 2018

(51) Int. Cl.
| | | |
|---|---|---|
| A23N 1/00 | (2006.01) | |
| A23B 7/152 | (2006.01) | |
| A23L 2/42 | (2006.01) | |
| A23L 2/04 | (2006.01) | |

(52) U.S. Cl.
CPC ............... *A23N 1/00* (2013.01); *A23B 7/152* (2013.01); *A23L 2/04* (2013.01); *A23L 2/42* (2013.01); *A23V 2002/00* (2013.01)

(58) Field of Classification Search
None
See application file for complete search history.

(56) References Cited

U.S. PATENT DOCUMENTS

| | | | |
|---|---|---|---|
| 1,506,571 | A | 8/1924 | Derember |
| 3,106,571 | A | 10/1963 | Birosel |
| 8,586,119 | B2 * | 11/2013 | Patel ............... A23N 1/00 426/330.5 |
| 8,679,562 | B2 * | 3/2014 | Patel ............... A23N 1/00 426/330.5 |
| 2004/0018285 | A1 | 1/2004 | Haynes |
| 2008/0178750 | A1 | 7/2008 | Rogers et al. |
| 2009/0291172 | A1 | 11/2009 | Saez |
| 2010/0055269 | A1 | 3/2010 | Haynes |
| 2011/0142995 | A1 | 6/2011 | Hinds |
| 2013/0156914 | A1 | 6/2013 | Patel |
| 2013/0156915 | A1 | 6/2013 | Patel |

FOREIGN PATENT DOCUMENTS

| | | |
|---|---|---|
| AT | 501237 A1 | 7/2006 |
| BE | 9905617 | 11/2009 |
| CN | 201667965 | 12/2010 |
| GB | 2323549 A | 9/1988 |
| IE | 19853804 A1 | 5/2000 |
| JP | 09-2888 | 9/1997 |

* cited by examiner

*Primary Examiner* — Tamra L. Dicus
(74) *Attorney, Agent, or Firm* — H. Brock Kolls

(57) ABSTRACT

The present invention relates to a method of preventing oxygen from contacting coconut water during extraction from a coconut. The method comprises the step of penetrating the shell of a coconut with at least one of a self sealing probe. The self sealing probe forms a seal between the shell of the coconut and the outer surface of the self sealing probe, preventing non-inert gases from ingress into the coconut contacting the coconut water therein. The method then prevents the coconut water from egress along the outer surface of the self sealing probe and modifies an atmospheric condition within the coconut by providing an inert gas. The atmospheric condition is selected to engender flow of the coconut water through the inside of the egress port. The coconut water is transferred into an oxygen free collection vessel.

30 Claims, 10 Drawing Sheets

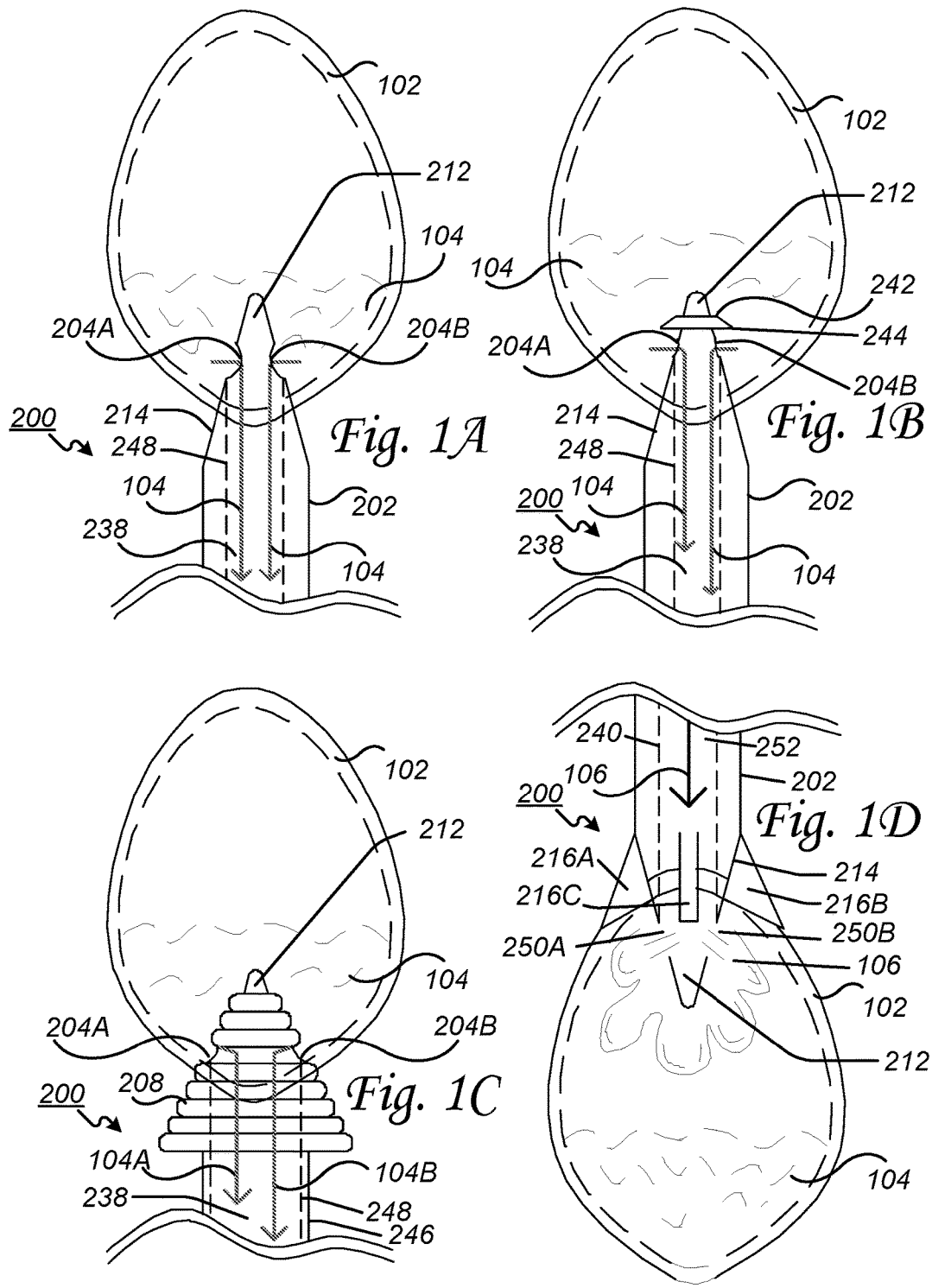

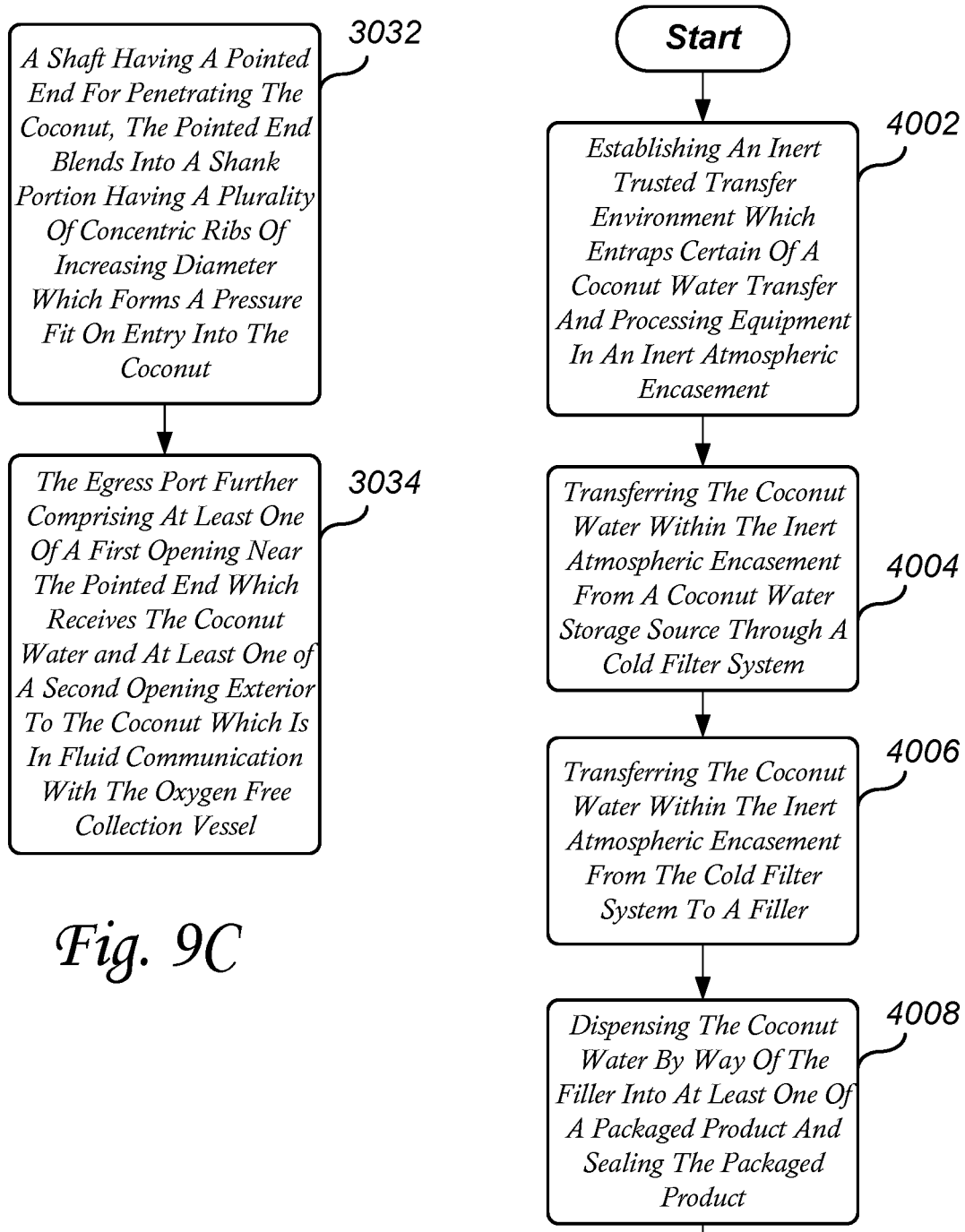

EXTRACTING AND PACKAGING COCONUT WATER BASED PRODUCTS IN AN INERT ATMOSPHERIC ENVIRONMENT

TECHNICAL FIELD OF THE INVENTION

This invention relates to a method of preventing oxygen from contacting coconut water during extraction from the coconut.

BACKGROUND OF THE INVENTION

Before our invention, prior art practices of extracting coconut water from a coconut, in the presence of air containing oxygen, unintentionally compromised the quality of the coconut water. In this regard, by allowing the coconut water to contact oxygen, in the air, chemical reactions, in the coconut water, are initiated. These reactions cause oxidation to rapidly degrade the coconut water flavor, color or clarity, nutritional or nutrient benefits, and/or degrade or impact other attributes of the coconut water that are sensitive to oxidation reactions.

Another shortcoming of prior art practices can be that since oxygen degrades the attributes of coconut water so quickly, growers may often be left with hoping that consumers will be unaware that their harvesting and coconut water extraction practices can be harmful to the consumer benefits associated with the coconut water. In this regard, prior art coconut water extraction practices can often nullify many of the consumer benefits, of the coconut water, long before it reaches the consumer.

Another shortcoming of prior art practices can be that for those growers that make an attempt to maintain some consumer benefit value, in their coconut water, post-harvest, the growers are often forced to undertake costly measures. On such measure can be transporting the coconuts to a remote location far from the grove for processing. This measure can be an attempt to harvest the coconut water, exposing the water to oxygen during extraction, but then trying to use the coconut water quickly before oxidation degradation destroys all of the consumer benefit attributes. This is a very costly approach, as it can require the grower to transport the heavy weight of the coconut solid matter twice; once with the coconut water in the coconut for extraction and a second time transporting the empty coconut waste away from the processing location.

Another shortcoming of prior art practices can be that coconut water extracted, in the presence of oxygen, starts a degradation process that in large part limits the coconut water, if extracted locally, from being transported to foreign countries and arrive in a grove-fresh state. In this regard, by the time the extracted coconut water arrives in a foreign country it is likely that the oxygen has oxidized the coconut water, irreversibly damaging the flavors, color or clarity, nutritional or nutrient benefit, and/or damaging other attributes of the coconut water.

Another shortcoming can be the handling of the coconut water during the transfer and processing from coconut to packaged product. In this regard, even if care is taken to extract the coconut water from the coconut, minimizing exposure to oxygen, subsequent handling, transfer, and processing through equipment to final product packaging can expose the coconut water to oxygen.

For these reasons and shortcomings as well as other reasons and shortcomings there is a long felt need that gives rise to the present invention.

SUMMARY OF THE INVENTION

Shortcomings of the prior art are overcome and additional advantages are provided through the provision of a method of preventing oxygen from contacting coconut water during extraction from a coconut. The method comprising the step of penetrating shell of a coconut with at least one of a self sealing probe, the self sealing probe forming a seal between shell of the coconut and the outer surface of the self sealing probe preventing non-inert gases from ingress into the coconut contacting a coconut water therein and preventing the coconut water from egress along the outer surface of the self sealing probe, the self sealing probe further comprising at least one of an egress port.

The method further comprising the step of modifying an atmospheric condition within the coconut by providing an inert gas by way of an inert gas source at desired atmospheric pressure through a gas inlet into the coconut. The atmospheric condition being selected to engender flow of the coconut water through the egress port. The coconut water is then transferred from the coconut by way of the egress port traversing the interior of the self sealing probe into an oxygen free collection vessel.

Additional shortcomings of the prior art are overcome and additional advantages are provided through the provision of a method of preventing oxygen from contacting coconut water during extraction from a coconut. The method comprising the step of penetrating the shell of a coconut with at least one of a self sealing probe, the self sealing probe forming a seal between the shell of the coconut and the outer surface of the self sealing probe preventing non-inert gases from ingress into the coconut contacting a coconut water therein and preventing the coconut water from egress along the outer surface of the self sealing probe, the self sealing probe further comprising an egress port.

The method further comprising the steps of penetrating the shell of the coconut with a second self sealing probe, the second self sealing probe further comprising a gas inlet, and modifying an atmospheric condition within the coconut by providing an inert gas by way of an inert gas source at a desired atmospheric pressure through the gas inlet. The atmospheric condition being selected to engender flow of the coconut water through the egress port. Then the coconut water is transferred from the coconut by way of the egress port traversing the interior of the self sealing probe into an oxygen free collection vessel.

Additional shortcomings of the prior art are overcome and additional advantages are provided through the provision of a system of preventing oxygen from contacting coconut water during extraction from a coconut. The system comprises an oxygen free collection vessel and at least one of a self sealing probe that penetrates the shell of a coconut.

The self sealing probe further comprising a tapered shaft having a pointed end for penetrating the coconut, the pointed end blends into a gradually widening portion which forms a pressure fit on entry into the coconut between outer surface of the gradually widening portion and the shell of the coconut. The self sealing probe forms a seal between the shell of the coconut and the outer surface of the self sealing probe preventing non-inert gases from ingress into the coconut contacting the coconut water therein and preventing the coconut water from egress along the outer surface of the self sealing probe.

The self sealing probe further comprising an egress port having a first opening near the pointed end receives the coconut water and a second opening exterior to the coconut which is in fluid communication with the oxygen free collection vessel, the coconut water traversing the interior of the self sealing probe.

Additional shortcomings of the prior art are overcome and additional advantages are provided through the provision of a system of preventing oxygen from contacting coconut water during extraction from a coconut. The system comprising an oxygen free collection vessel and at least one of a self sealing probe penetrates the shell of a coconut.

The self sealing probe further comprising a tapered shaft having a pointed end and a ribbed end for penetrating the coconut. A gradually widening portion having a narrow top and a wider bottom, the narrow top blends with the ribbed end. At least a portion of the narrow top being of smaller diameter than the ribbed end so that at least a portion of the ribbed end forms an overhang. The wider bottom is larger in diameter than the ribbed end. The gradually widening portion forms a pressure fit on entry into the coconut between the outer surface of the gradually widening portion and the shell of the coconut.

Additionally, the self sealing probe further comprising an egress port which further comprises at least one of a first opening near the overhang which receives the coconut water and at least one of a second opening exterior to the coconut which is in fluid communication with the oxygen free collection vessel. The overhang minimizing material from the shell of the coconut from clogging the first opening during insertion of the self sealing probe into the coconut, wherein the coconut water extracted exits from the coconut through the egress port traversing the interior of the self sealing probe and is transferred to the oxygen free collection vessel preventing exposure to non-inert gases.

Additional shortcomings of the prior art are overcome and additional advantages are provided through the provision of a system of preventing oxygen from contacting coconut water during extraction from a coconut. The system comprising an oxygen free collection vessel and at least one of a self sealing probe penetrates the shell of a coconut.

The self sealing probe further comprising a shaft having a pointed end for penetrating the coconut, the pointed end blends into a plurality of concentric ribs of increasing diameter which forms a pressure fit on entry into the coconut between the outer surface of the plurality of concentric ribs and the shell of the coconut.

Additionally, the self sealing probe further comprises an egress port which further comprises at least one of a first opening near the pointed end which receives the coconut water and at least one of a second opening exterior to the coconut which is in fluid communication with the oxygen free collection vessel. The coconut water traversing the interior of the self sealing probe.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 1A-1E illustrates example of a self sealing probe for extracting coconut water from a coconut while preventing oxygen from contacting the coconut water during extraction from the coconut;

FIGS. 7, 8, and 9A-9C illustrate examples of a method of preventing oxygen from contacting the coconut water during extraction from a coconut; and FIGS. 10-13 illustrate examples of a method of preventing oxygen from contacting coconut water during processing and packaging of the coconut water.

Figure 1E:
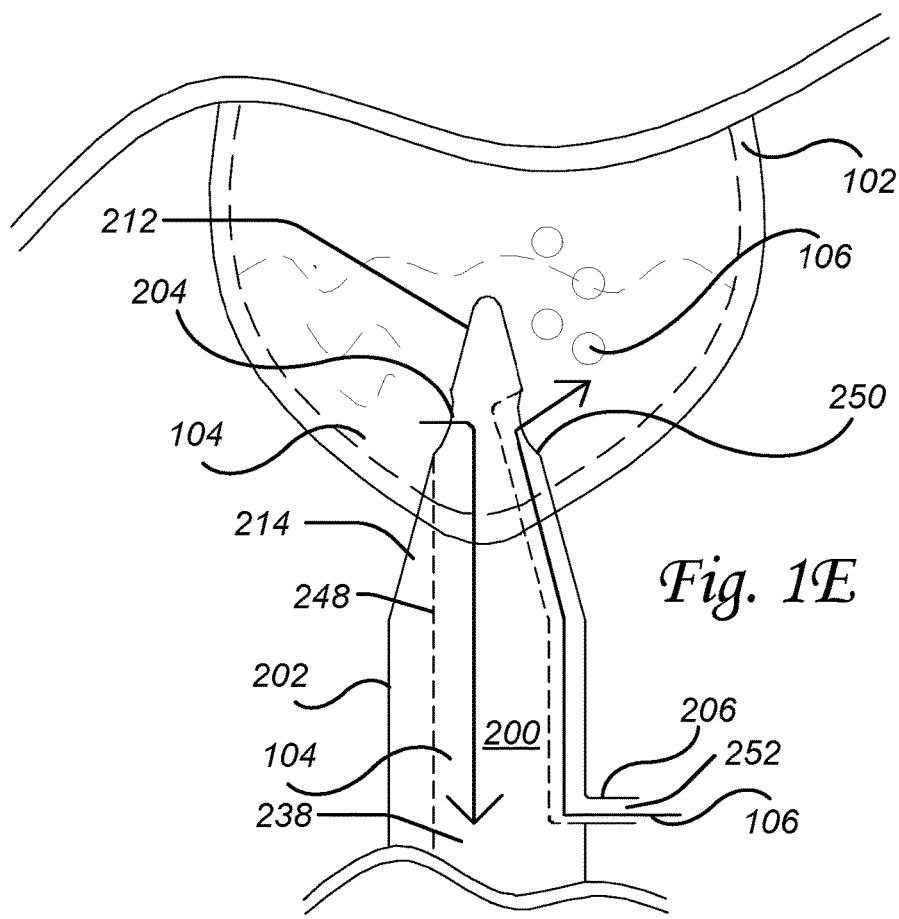

The detailed description explains the preferred embodiments of the invention, together with advantages and features, by way of example with reference to the drawings.

DETAILED DESCRIPTION OF THE INVENTION

With regards to the consumer benefits of coconut water, coconut water comprises organic compounds possessing healthy growth promoting properties that have been known to help keep the human body cool and at the proper temperature, orally re-hydrate the body, it is an all natural isotonic beverage, carries nutrients and oxygen to the cells, and naturally replenishes the body's fluids after exercising. In addition, other coconut water benefits can include raising the body's metabolism, promoting weight loss, boosting the body's immune system, detoxifying and fighting viruses, and cleansing the body's digestive tract. Furthermore, other coconut water benefits can include controlling diabetes, aiding the body in fighting viruses that cause the flu, herpes, and AIDS, balancing the body's PH and reducing the risk of cancer, treating kidney and urethral stones, and boosting poor circulation. Coconut water is also low in carbohydrates, 99% fat free, and low in sugar. In the presence of oxygen, oxidation of the coconut water begins degrading many of the consumer benefits mention above, as well as degrading other consumer benefits. Such oxidation degrades coconut water quickly. If the coconut water is not extracted and stored in an oxygen free manner and environment, the normal delay in reaching the consumer may mean that the consumer may never realize the benefits of consuming or using the coconut water based products.

Another advantage of the present invention is that the coconut water is extracted from the coconut in a manner which prevents oxygen in the air from contacting the coconut water during extraction from the coconut. In this regard, the environment inside the coconut prior to breech is oxygen free; prior art methods of cracking the coconut to get the coconut water out of the coconut exposes the coconut water to oxygen. As soon as oxygen contacts the coconut water certain chemical and oxidation reactions begin. These chemical and oxidation reactions very quickly degrade the flavor, color or clarity, nutritional or nutrient value, and/or degrade or impact other attributes of the coconut water that are sensitive.

These reactions begin quickly and within the first 48 hours of exposure to oxygen much of the high quality benefits of flavor, color or clarity, nutritional or nutrient value, and other attributes of the coconut water can be degraded or impacted to the point the product quality is irreversibly damaged and can be perceived by the consumer in lacking at least freshness, nutritional benefit, and fortification. The present invention extracts coconut water in a manner which prevents oxygen from contacting the coconut water during extraction from the coconut. Furthermore, the extracted coconut water is stored in an oxygen free collection vessel. The system and method of the present invention prevents oxygen from contacting the coconut water during extraction and subsequent storage and as a result the flavor, color or clarity, nutritional or nutrient value, and/or other attributes of the coconut water are preserved. This translates into delivering to the consumer a better product that has fresher taste with superior well protected consumer benefits, as compared to prior art coconut water extraction practices.

Use of the term 'gas', 'inert gas', or 'noble gas', in the present invention, is intended to include any gas that does not chemically react with other substances, such as coconut water, except maybe under certain special conditions. As an example and not a limitation such gas, inert gas, and/or noble gas as defined can include nitrogen, helium, neon, argon, krypton, xenon, radon, and other gases that do not chemically react with other substances, such as coconut water, except maybe under certain special conditions, as may be required and/or desired in a particular embodiment. For disclosure purposes gas, inert gas, and noble gas can be referred to as gas. In addition, nitrogen is considered to be a mostly inert diatomic gas at standard conditions.

For disclosure purposes a packaged product 228 can be a beverage product, a beauty care product, or other type or kind of product, as may be required and/or desired in a particular embodiment.

Figure 3:
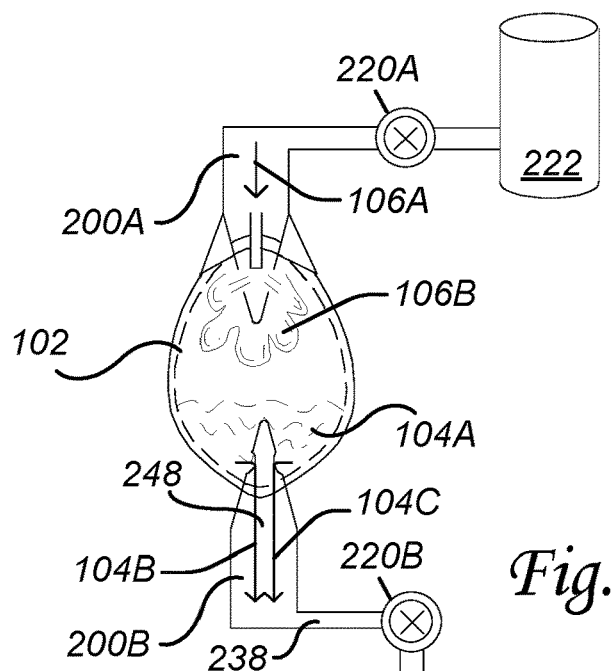
Figure 4:
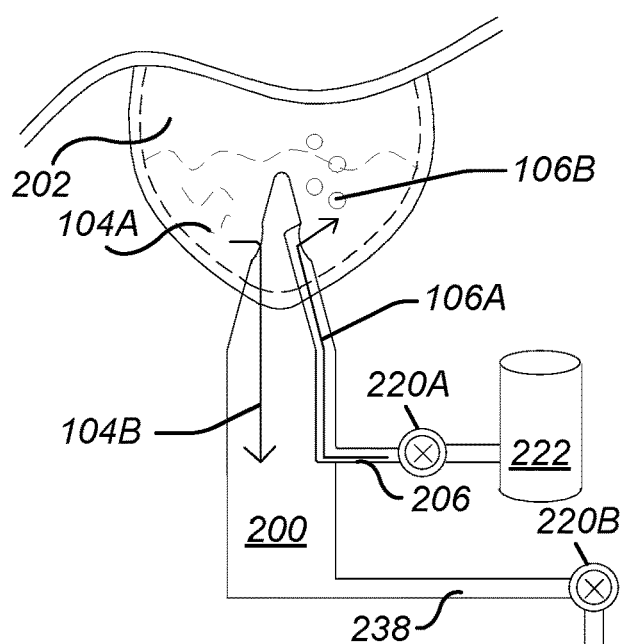

Turning now to the drawings in greater detail, it will be seen that in FIG. 1A there is illustrated one example of a self sealing probe 200 for extracting coconut water 104 from a coconut 102 while preventing oxygen from contacting the coconut water 104 during extraction from the coconut 102. In an exemplary embodiment, a self sealing probe 200 can comprise a tapered shaft 202 having a pointed end 212 oriented to penetrate a coconut 102, the pointed end 212 blends into a gradually widening portion 214 which forms a pressure fit on entry into the coconut 102 between the outer surface of the gradually widening portion 214 and shell of the coconut 102. The self sealing probe 200 further comprising at least one of an egress port 248. The egress port 248 having at least one of a first opening 204A (a second opening is illustrated as 204B) near the pointed end 212 to receive the coconut water 104 and at least one of a second opening 238 exterior to the coconut 102 which is in fluid communication with the oxygen free collection vessel 218. The coconut water 104 traversing the interior of the self sealing probe 200. At least FIGS. 1A, 3, and 4 illustrate the flowing of the coconut water 104 through the egress port 248 openings 202A and 202B traversing the interior of the self sealing probe 200 and exiting the self sealing probe 200 by way of the second opening 238 into the oxygen free collection vessel 218.

In operation, at least one of the self sealing probe 200 penetrates the shell of the coconut 102, the self sealing probe 200 forming a seal between the shell of the coconut 102 and the outer surface of the self sealing probe 200 preventing non-inert gases from ingress into the coconut 102 contacting the coconut water 104 therein and preventing the coconut water 104 from egress along the outer surface of the self sealing probe 200. Rather, the coconut water 104 traverse the interior egress port 248 of the self sealing probe 200 in route to the oxygen free storage vessel 218.

Referring to FIG. 1B there is illustrated one example of a self sealing probe 200 for extracting coconut water 104 from a coconut 102 while preventing oxygen from contacting the coconut water 104 during extraction from the coconut 102. In an exemplary embodiment, a tapered shaft 202 having a pointed end 212 and a ribbed end 242 is orientated to penetrate the coconut 102. A gradually widening portion 214 having a narrow top and a wider bottom, the narrow top blends with the ribbed end 242. At least a portion of the narrow top being of smaller diameter than the ribbed end 242 so that at least a portion of the ribbed end 242 forms an overhang 244, the wider bottom is larger in diameter than the ribbed end 242, the gradually widening portion 214 forms a pressure fit on entry into the coconut 102 between the outer surface of the gradually widening portion 214 and the shell of the coconut 102.

The self sealing probe further comprising at least one of an egress port 248. The egress port 248 having at least one of a first opening 204A (a second opening is illustrated as 204B) near the overhang 244 to receive the coconut water 104 and at least one of a second opening 238 exterior to the coconut 102 which is in fluid communication with the oxygen free collection vessel 218. The overhang 242 minimizes material from the shell of the coconut 102 from clogging the first openings 204A and 204B during insertion of the self sealing probe 200 into the coconut 102.

In operation, at least one of the self sealing probe 200 penetrates the shell of the coconut 102, the self sealing probe 200 forming a seal between the shell of the coconut 102 and the outer surface of the self sealing probe 200 preventing non-inert gases from ingress into the coconut 102 contacting a coconut water 104 therein and preventing the coconut water 104 from egress along the outer surface of the self sealing probe. Rather, the coconut water 104 traverses the interior egress port 248 of the self sealing probe 200 in route to the oxygen free storage vessel 218.

Referring to FIG. 1C there is illustrated one example of a self sealing probe 200 for extracting coconut water 104 from a coconut 102 while preventing oxygen from contacting the coconut water 104 during extraction from the coconut 102. In an exemplary embodiment, a shaft 246 having a pointed end 212 orientated to penetrate the coconut 102, the pointed end 212 blends into a plurality of concentric ribs 208 of increasing diameter which forms a pressure fit on entry into the coconut 102 between the outer surface of the plurality of concentric ribs 208 and the shell of the coconut 102.

The self sealing probe 200 further comprising at least one of an egress port 248. The egress port 248 further comprising at least one of a first opening 204A (a second opening is illustrated as 204B) near the pointed end 212 which receives the coconut water 104 and at least one of a second opening 238 exterior to the coconut 102 which is in fluid communication with the oxygen free collection vessel 218.

Referring to FIG. 1D there is illustrated one example of a self sealing probe 200 for extracting coconut water 104 from a coconut 102 while preventing oxygen from contacting the coconut water 104 during extraction from the coconut 102. In an exemplary embodiment, a tapered shaft 202 having a pointed end 212 for penetrating the coconut 102, the pointed end 202 blends into a gradually widening portion 214 which forms a pressure fit on entry into the coconut 102 between the outer surface of the gradually widening portion 214 and the shell of the coconut 102.

The self sealing probe 200 further comprising at least one of a coconut stabilizer 216A (also illustrated coconut stabilizers 216B and 216C). The coconut stabilizer 216A is formed on the outer surface of the self sealing probe 200, the coconut stabilizer 216A making contact with the shell of the coconut 102 outer surface when the self sealing probe 200 is inserted into the coconut 102, wherein the coconut stabilizer 216A, 216B, and 216C mitigate the coconut 102 movement and improves the integrity of the seal between the shell of the coconut 102 and the outer surface of the self sealing probe 200 during extraction of the coconut water 104.

The self sealing probe further comprising a gas inlet 240. The gas inlet 240 having at least one of a first gas opening 250A. The first gas opening 250A is exposed to the interior of the coconut 102 when the self sealing probe 200 is inserted into the coconut 102 and at least one of a second gas opening 252 exterior to the coconut 102 which is operational coupled to an inert gas supply 222.

In operation, an atmospheric condition can be modified within the coconut 102 by providing an inert gas 106 by way of an inert gas source 222 at a desired atmospheric pressure through the gas inlet 240, the atmospheric condition being selected to engender flow of the coconut water 104 through an egress port 248 which not shown in this Figure. The coconut water 104, from the coconut 102, is transferred by way of the egress port 248, traversing the interior of the self sealing probe 200, into an oxygen free collection vessel 218.

In an exemplary embodiment, the gas inlet 240 provides an inert gas 106 by way of an inert gas source 222 which modifies an atmospheric condition, within the coconut 102, to a desired atmospheric pressure, the atmospheric condition being selected to engender flow of the coconut water 104 from the coconut 102 through interior of the egress port 248 into the oxygen free collection vessel 218 protecting the coconut water 104 from exposure to oxygen.

Referring to FIG. 1E there is illustrated one example of a self sealing probe 200 for extracting coconut water 104, from a coconut 102, while preventing oxygen from contacting the coconut water 104 during extraction from the coconut 102. In an exemplary embodiment, a self sealing probe comprises a tapered shaft 202 having a pointed end 212 for penetrating the coconut 102, the pointed end 212 blends into a gradually widening portion 214 which forms a pressure fit on entry into the coconut 102 between the outer surface of the gradually widening portion 214 and the shell of the coconut 102.

The self sealing probe 200 further comprising an egress port 248. The egress port 248 having at least one of a first opening 204 near the pointed end 212 to receive the coconut water 104 and at least one of a second opening 238 exterior to the coconut 102 which is in fluid communication with the oxygen free collection vessel 218.

The self sealing probe 200 further comprising a gas inlet 206. The gas inlet 206 having at least one of a first gas opening 250 is exposed to the interior of the coconut 102 when the self sealing probe 200 is inserted into the coconut 102 and at least one of a second gas opening 252 exterior to the coconut which is operationally coupled to an inert gas supply 222 which provides an inert gas 106.

In operation, the self sealing probe 200 is forcefully caused to penetrate the shell of a coconut 102, the self sealing probe 200 forming a seal between the shell of the coconut 102 and the outer surface of the self sealing probe 200 preventing non-inert gases such as oxygen from ingress into the coconut 102 contacting a coconut water 104 therein and preventing the coconut water 104 from egress along the outer surface of the self sealing probe 200.

An atmospheric condition within the coconut 102 is modified by providing an inert gas 106 by way of an inert gas source 222 at a desired atmospheric pressure through a gas inlet 206 into the coconut 102, the atmospheric condition being selected to engender flow of the coconut water 104 through the egress port 248. The coconut water 104 is transferred from the coconut 102 by way of the egress port 248 traversing the interior of the self sealing probe 200 into an oxygen free collection vessel 218.

Figure 2:
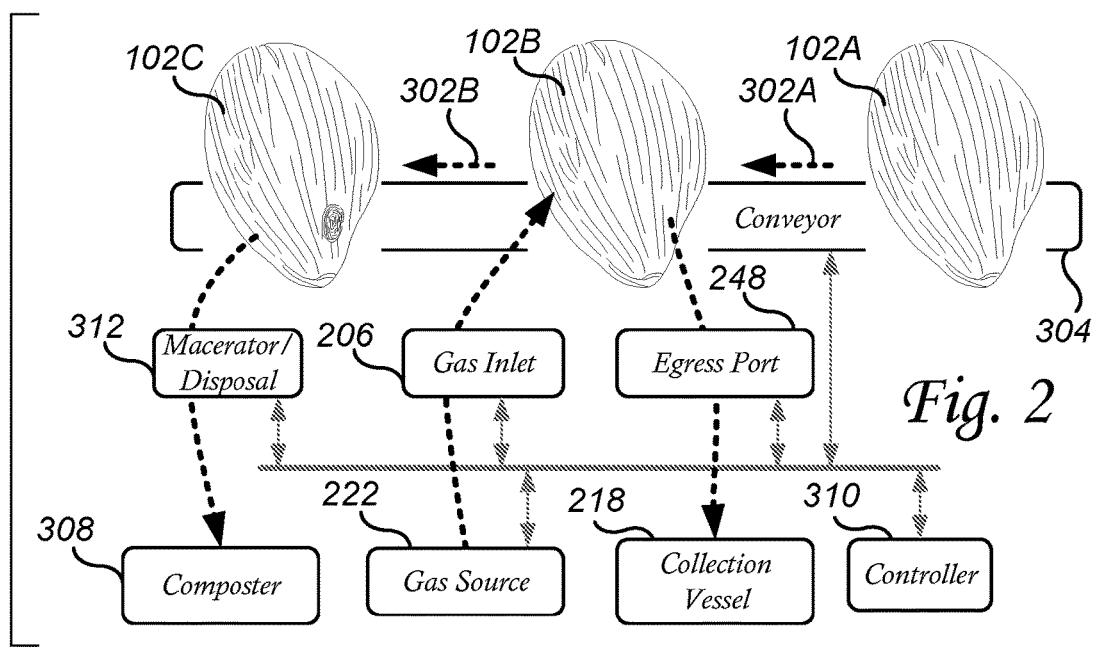
FIGS. 2-4 illustrate examples of a system and method for preventing oxygen from contacting coconut water during extraction from a coconut.

Referring to FIG. 2 there is illustrated one example of a system and method for preventing oxygen in the air from contacting coconut water 104 during extraction from a coconut 102. In an exemplary embodiment, a coconut 102A can be conveyed by a conveyor 304 to a coconut water extraction point 302A. An egress port 248 and a gas inlet 206 can be inserted or otherwise penetrate the coconut 102B shell to reach the coconut water 104 inside the coconut 102. The insertion of the egress port 248 and gas inlet 206 is done in a manner as not to allow non-inert gas such as oxygen to reach the coconut water 104. The egress port 248 is in fluid communication with a collection vessel 218. The gas inlet 206 is in communication with an inert gas source 222. Such an inert gas 106 can be a gas such as nitrogen, or other inert and/or noble gas, as may be required and/or desired in a particular embodiment. For purposes of disclosure coconut 102A-C can be referred to as coconut 102. In an exemplary embodiment, for example and not a limitation, conveyor 304 can be a linear track type conveyor, a rotary turn style type conveyor, and/or other types and kinds of conveyors, as may be required and/or desired in a particular embodiment.

In an exemplary embodiment, in operation, an inert gas at desired atmospheric pressure is discharged into the coconut 102B. The inert gas 106 is discharge into the coconut 102B in part to cause the coconut water 104 to egress the coconut 102 through the egress port 248 into the oxygen free collection vessel 218. Once the coconut water 104 has been extracted from the coconut 102B, the conveyor 304 conveys the coconut 102B to a maceration or disposal location 302B. The coconut 102C is then macerated by macerator 312 or otherwise disposed and turned into composting material by composter 308.

In an exemplary embodiment, a controller 310 is operationally related to the conveyor 304, egress port 248, inert gas inlet 206, inert gas source 222, macerator 312, and/or other operational elements of the system, as may be required and/or desired in a particular embodiment. In a first exemplary embodiment, a self sealing probe 200 can comprise the gas inlet 206 and the egress port 248. In a second exemplary embodiment, two self sealing probes 200 can be used, one comprising the egress port 248 and the other comprising the inert gas inlet 206.

Referring to FIG. 3 there is illustrated one example of a system and method for preventing oxygen from contacting coconut water 104 during extraction from a coconut 102. In an exemplary embodiment, two self sealing probes 200A and 200B can be used during the coconut water 104A extraction. The first self sealing probe 200A is positioned at one end of the coconut 102 and the second self sealing probe 200B is positioned opposite the first self sealing probe 200A. The first self sealing probe 200A and the second self sealing probe 200B can be orientated at other opposing angles, as may be required ad/or desired in a particular embodiment.

In operation, mechanical or other force of convenience causes the two self sealing probes 200A and 200B to pierce the coconut 102 shell and enter the interior of the coconut 102. An atmospheric condition is modified within the coconut 102 by providing an inert gas 106A and 106B by way of an inert gas source 222 at a desired atmospheric pressure through a gas inlet 206A into the coconut 102, the atmospheric condition being selected to engender flow of the coconut water 104A, 104B, and 104C through the egress port 248. The coconut water 104 is transferred from the coconut 102 by way of the egress port 248 traversing the interior of the self sealing probe 200B, exiting the self sealing probe 200B by way of egress port opening 238, and collected in an oxygen free collection vessel 218.

General purpose valves 220A and 220B can be used for system component connectivity and aid in system operation and flow control. In an exemplary embodiment, the atmospheric condition selected can be a positive inert gas pressure 106B to force the coconut water 104A to egress the coconut by way of the egress port 248. The atmospheric condition selected can vary, as maybe required and/or desired in a particular embodiment.

Referring to FIG. 4 there is illustrated one example of a system and method for preventing oxygen from contacting coconut water 104 during extraction from a coconut 102. In an exemplary embodiment, a single self sealing probe 200 having both an egress port 248 and a gas inlet 206 can be used to extract the coconut water 104A.

In operation, mechanical or other suitable choice of force causes the self sealing probes 200 to pierce the coconut 102 shell and enter the interior of the coconut 102. An atmospheric condition is modified within the coconut 102 by providing an inert gas 106A and 106B by way of an inert gas source 222, at a desired atmospheric pressure, through a gas inlet 206 into the coconut 102, the atmospheric condition being selected to engender flow of the coconut water 104A and 104B through the egress port 248. The coconut water 104 is transferred from the coconut 102 by way of the egress port 248 traversing the interior of the self sealing probe 200, exiting the self sealing probe 200 by way of the egress port opening 238, and collected in an oxygen free collection vessel 218.

General purpose valves 220A and 220B can be used to system component connectivity and aid in system operation and flow control. In an exemplary embodiment, the atmospheric condition selected can be a positive inert gas pressure 106B to force the coconut water 104A to egress the coconut 102 by way of the egress port 248. The atmospheric condition selected can vary, as maybe required and/or desired in a particular embodiment.

Figure 5:
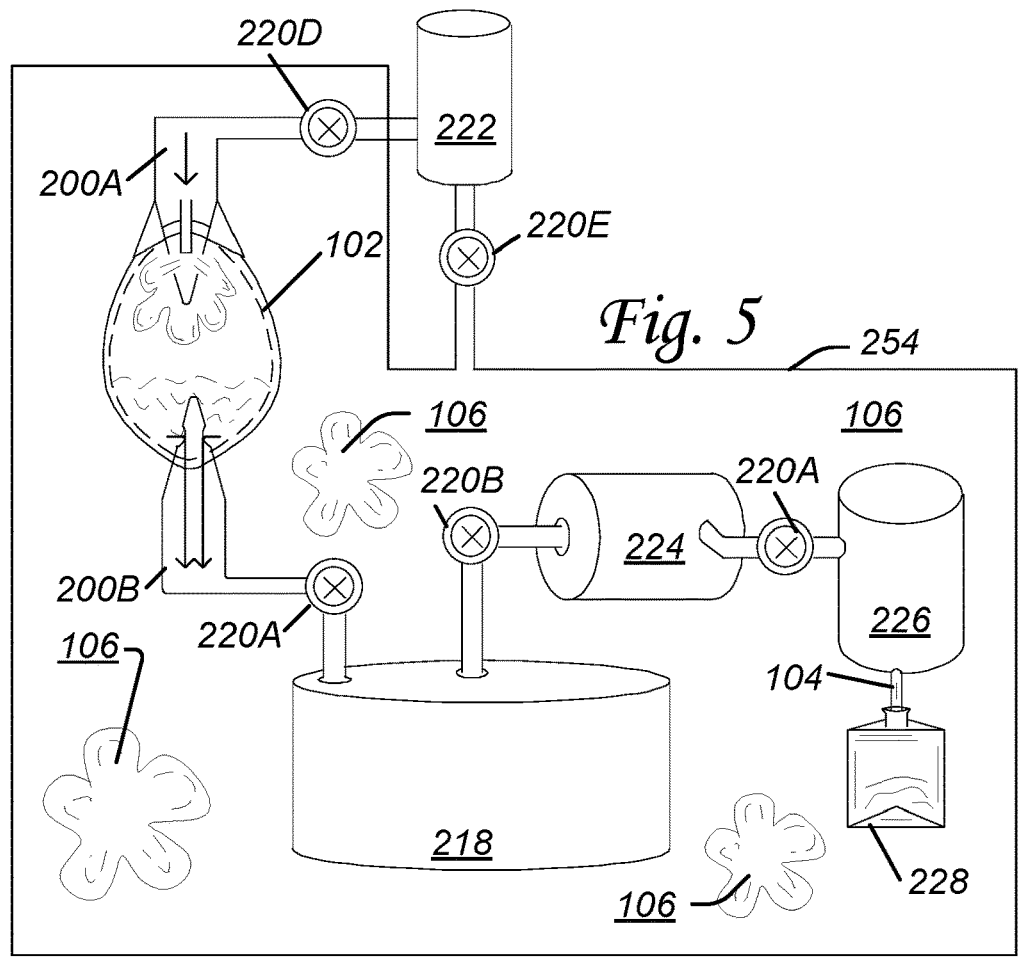
FIGS. 5-6 illustrate examples of transferring and processing equipment for packaging products containing at least a portion of coconut water.

Referring to FIG. 5 there is illustrated one example of transferring and processing equipment for packaging products containing at least a portion of coconut water. In an exemplary embodiment, an inert trusted transfer environment 254 can be established which entraps certain of the coconut water 104 transfer and processing equipment in an inert atmospheric encasement created by inert gas 106, preventing non-inert gas, such as oxygen, contact with the coconut water 104 during transfer and processing from a coconut water storage source 218 to a packaged product, wherein the packaged product containing at least portion of the coconut water 104. Such transfer and processing equipment can include oxygen free collection vessel 218 also referred to as a coconut water storage sources 218. Other transfer and processing equipment can include filtration equipment 224, such as a cold filter system to remove any microbiological pathogens and other filtering, as may be required and/or desired in a particular embodiment. Additional transfer and processing equipment can also include filler 226 used to fill package 228 and valves 220A, 220B, and 220C.

Furthermore, in an exemplary embodiment, the extracted coconut water 104 can be transferred from the egress port 248 through an inert trusted transfer environment 254 which entraps certain of the coconut water transfer and processing equipment in an inert atmospheric encasement created by inert gas 106, preventing non-inert gas, such as oxygen, contact with the coconut water 104 during transport to the oxygen free collection vessel 218. In this regard, in a plurality of exemplary embodiments, the transfer and processing equipment can vary and as little as one piece of equipment can be encased. As example and not a limitation, the self sealing probes 200A and 200B and optionally the coconut 102 can be encased in an inert atmospheric environment. In another example and not a limitation the filler 226 and package 228 can be encased in an inert atmospheric environment.

Such an inert trusted transfer environment 254 can be established which entraps certain of the coconut water 104 transfer and processing equipment can be created by wrapping a piece of equipment and injecting the inert gas 106 between the equipment and wrap layer. It can also be created by placing equipment in an enclosed area and injecting the inert gas 106 into the closed area displacing and air that is present. It can also be created by dosing package 228 and other vessels with the inert gas 106 to displace the air inside, creating an inert trusted transfer environment within the package 228. At least FIGS. 5 and 6 illustrate this by placing a boundary around the equipment and showing an inert gas 106 environment around the equipment and package 228.

Figure 6:
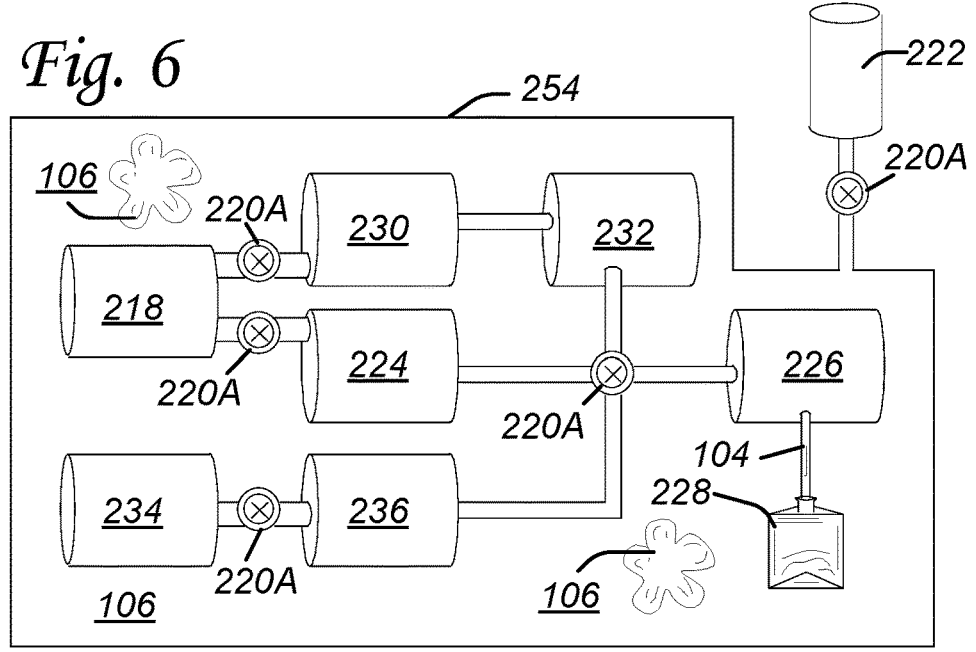

Referring to FIG. 6 there is illustrated one example of transferring and processing equipment for packaging products containing at least a portion of coconut water. In an exemplary embodiment, a heat treatment coconut water portion can be sterilized by way of heat treatment 230. The heat treatment coconut water portion can be mixed with the coconut water processed by way of the cold filter system 224. In this regard, a plurality of desirable organic compounds that were removed from the coconut water 104 when passed through the cold filter system 224 is restored to the coconut water 104 by way of the (unfiltered) heat treatment coconut water portion. In an exemplary embodiment, the plurality of useful compounds can include amino acids, nutrients, and other useful organic compounds.

To elaborate, microfiltration by way of filtration system 224 can stripe everything larger than the filter pore size, as example in the range of 0.2 microns. While making the coconut water 104 sterile by removing the biological pathogens, the small pore size can also remove some of the useful organic compounds from the coconut water. To restore the useful compounds a portion of coconut water 104 is heat treated to sterilize by way of heat treatment system 230. Additional post processing 232 can be used as necessary such as cooling or storing temporarily the heat treated portion or other post process, as may be required and/or desired in a particular embodiment.

In another exemplary embodiment, at least one of an additive can be dosed by way of doser 236 into the coconut water 104. In this regard, flavor, color, nutrients, nutraceuticals, and other additives, as may be required and/or desired can be dosed into the coconut water 104. The doser 236 receives the additive material from a additive supply 234 which is operationally connected.

Such an inert trusted transfer environment 254 which entraps certain of the coconut water 104 transfer and processing equipment can be established by wrapping a piece of equipment and injecting the inert gas 106 between the equipment and wrap layer. It can also be created by placing equipment in an enclosed area and injecting the inert gas 106 into the closed area displacing and air that is present. It can also be created by dosing package 228 and other vessels to displace the air with oxygen inside, in effect creating an inert trusted transfer environment within the package 228. At least FIGS. 5 and 6 illustrate this by placing a boundary around the equipment and showing an inert gas 106 environment around the equipment and package 228.

Figure 7:
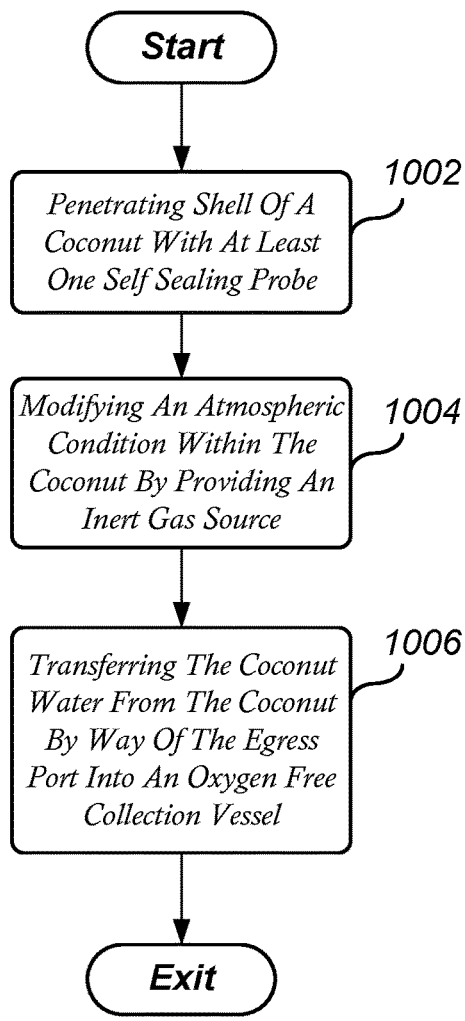

Referring to FIG. 7 there is illustrated one example of a method of preventing oxygen from contacting the coconut water during extraction from a coconut. In an exemplary embodiment, the shell of a coconut 102 can be penetrated by at least one of a self sealing probe 200. An atmospheric condition can then be modified within the coconut by providing an inert gas 106 by way of an inert gas source 222. The atmospheric condition selected causes the coconut water 104 inside the coconut 102 to transfer through an egress port 248 to an oxygen free collection vessel 218. The method begins in block 1002.

In block 1002, the shell of a coconut is penetrated with at least one of a self sealing probe 200, the self sealing probe 200 forming a seal between the shell of the coconut 102 and the outer surface of the self sealing probe 200 preventing non-inert gases, such as oxygen, from ingress into the coconut 102 contacting a coconut water 104 therein and preventing the coconut water 104 from egress along the outer surface of the self sealing probe 200. The self sealing probe 200 further comprising at least one of an egress port 248. In an exemplary embodiment, a mechanical force or other suitable force can be applied to the coconut 102 or to the self sealing probe 200 to cause the self sealing probe 200 to penetrate the coconut 102. The method move to block 1004.

In block 1004, an atmospheric condition is modified within the coconut by providing an inert gas 106 by way of an inert gas source 222 at a desired atmospheric pressure through a gas inlet 206 into the coconut 102, the atmospheric condition being selected to engender flow of the coconut water 104 through the egress port 248. In an exemplary embodiment, the atmospheric condition can be creating a positive inert gas 106 pressure to force the coconut water 104 out of the coconut 102 by way of egress port 248.

In an alternative exemplary embodiment, the atmospheric condition could be nominal or ambient pressure providing a source of inert gas 102 such that a negative or vacuum pressure elsewhere in the system causes the coconut water 104 to be sucked or drawn out of the coconut 102 through the egress port 248. The inert gas at nominal pressure or ambient pressure preventing a vacuum from occurring within the coconut 102 and allowing the coconut water 104 to exit the coconut 102. The method continues in block 1006.

In block 1006, the coconut water is transferred from the coconut 102 by way of the egress port 248 traversing the interior of the self sealing probe 200 into an oxygen free collection vessel 218. The method is then exited.

Figure 8:
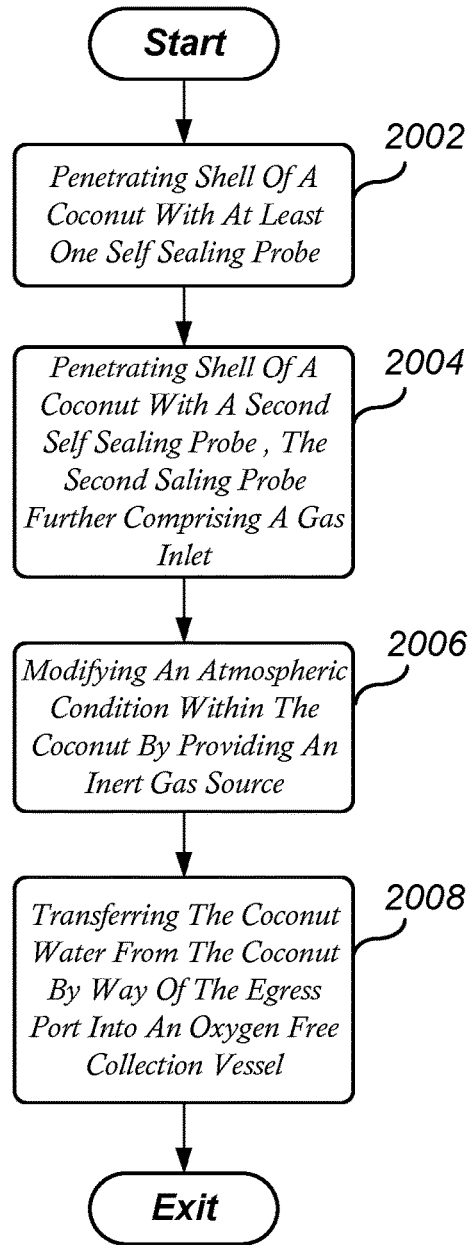

Referring to FIG. 8 there is illustrated one example of a method of preventing oxygen from contacting the coconut water during extraction from a coconut. In an exemplary embodiment and with reference to at least FIG. 3, the shell of a coconut 102 can be penetrated by at least one of a self sealing probe 200B. The shell of the coconut 102 can also be penetrated by a second self sealing probe 200A. The second self sealing probe 200A further comprises a gas inlet 206. An atmospheric condition can then be modified within the coconut 102 by providing an inert gas 106 by way of an inert gas source 222. The atmospheric condition, selected causes the coconut water 104 inside the coconut 102 to transfer through an egress port 248 to an oxygen free collection vessel 218. The method begins in block 2002.

In block 2002, the shell of a coconut 102 can be penetrated with at least one of a self sealing probe 200B, the self sealing probe 200B forming a seal between the shell of the coconut 102 and the outer surface of the self sealing probe 200 preventing non-inert gases from ingress into the coconut 102 contacting a coconut water 104 therein and preventing the coconut water 104 from egress along the outer surface of the self sealing probe 200, the self sealing probe 200 further comprising an egress port 248. In an exemplary embodiment, a mechanical force or other suitable force can be applied to the coconut 102 or to the self sealing probe to cause the self sealing probe 200 to penetrate the coconut 102. The method moves to block 2004.

In block 2004, the shell of the coconut 102 can be penetrated with a second self sealing probe, the second self sealing probe further comprising a gas inlet 206. In an exemplary embodiment, a mechanical force or other suitable force can be applied to the coconut 102 or to the second self sealing probe to cause the second self sealing probe 200 to penetrate the coconut 102. The method moves to block 2006.

In block 2006, an atmospheric condition within the coconut 102 can be modified by providing an inert gas 106 by way of an inert gas source 222 at desired atmospheric pressure through the gas inlet 206, the atmospheric condition being selected to engender flow of the coconut water 104 through the egress port 248. In an exemplary embodiment, the atmospheric condition can be creating a positive inert gas 106 pressure to force the coconut water 104 out of the coconut 102 through the egress port 248.

In an alternative exemplary embodiment, the atmospheric condition could be nominal or ambient pressure providing a source of inert gas 106 such that a negative or vacuum pressure elsewhere in the system causes the coconut water 104 to be sucked or drawn out of the coconut 102 through the egress port 248. The inert gas at nominal pressure or ambient pressure preventing a vacuum from occurring within the coconut 102 and allowing the coconut water 104 to exit the coconut 102 through the egress port 248. The method continues in block 2008.

In block 2008, the coconut water 104 is transferred from the coconut 102 by way of the egress port 248 traversing the interior of the self sealing probe 200 into an oxygen free collection vessel 218. The method is then exited.

Figure 9A:
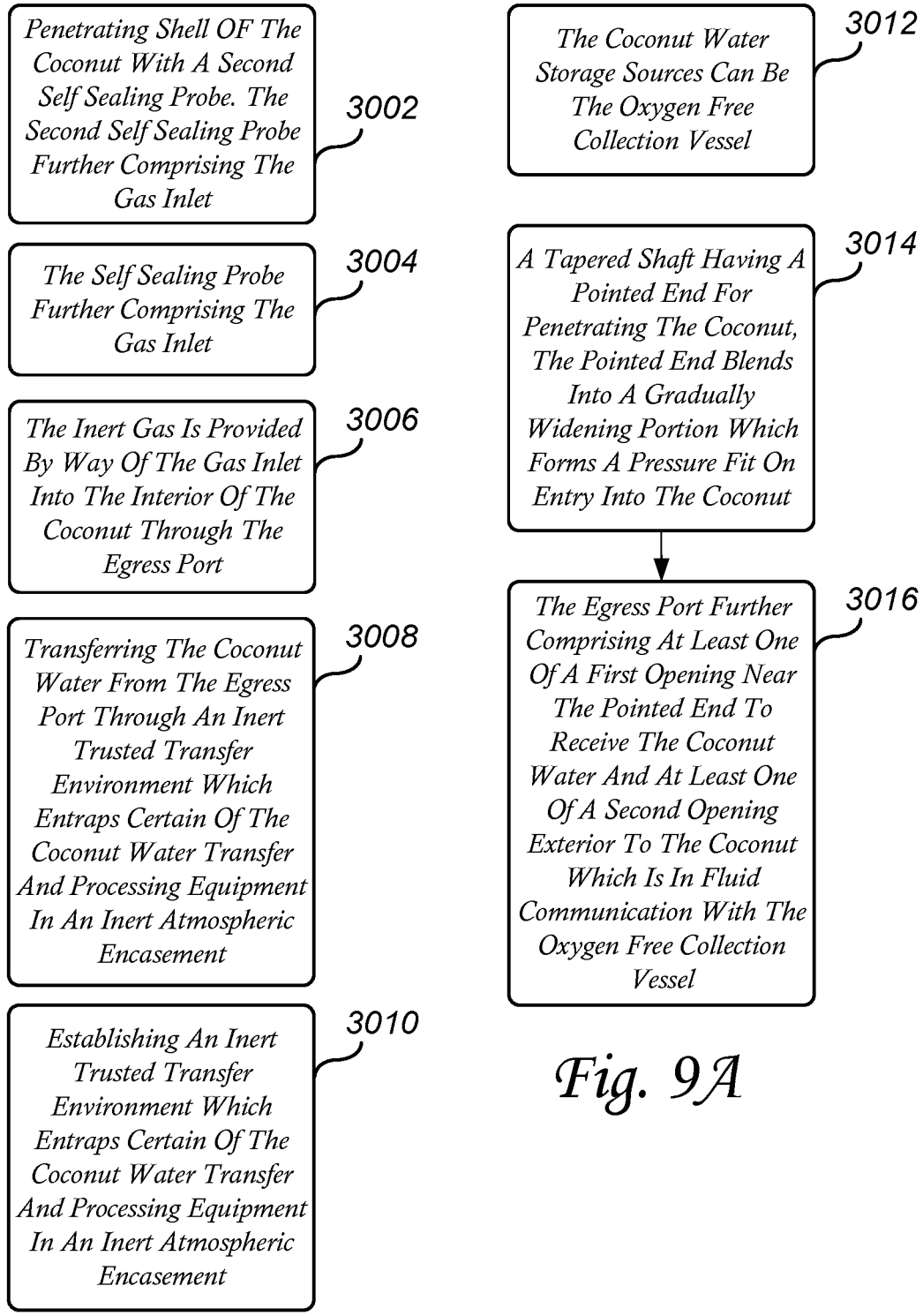

Referring to FIG. 9A there is illustrated exemplary embodiments of a method of preventing oxygen from contacting the coconut water 104 during extraction from a coconut 102.

In block 3002, in an exemplary embodiment, the shell of the coconut 102 can be penetrated with a second self sealing probe, the second self sealing probe further comprising the gas inlet 206.

In block 3004, in an exemplary embodiment, the self sealing probe further comprising the gas inlet 206.

In block 3006, in an exemplary embodiment, the inert gas 106 is provided by way of the gas inlet 206 into the interior of the coconut 102 through the egress port 248.

In block 3008, in an exemplary embodiment, the coconut water 104 is transferred from the egress port 248 through an inert trusted transfer environment 254 which entraps certain of the coconut water transfer and processing equipment in an inert atmospheric encasement, preventing non-inert gas, such as oxygen, from making contact with the coconut water 104 during transport to the oxygen free collection vessel 218.

In block 3010, an inert trusted transfer environment 254 is established which encases and entraps certain of the coconut water transfer and processing equipment (as example and not a limitation at least one of but not limited to 200, 218, 224, 226, 230, 232, 234, 236 package 228) in an inert atmospheric encasement created by inert gas 106, preventing non-inert gas from making contact with the coconut water 104 during transfer and processing from a coconut water storage source 218 to a packaged product 228. The packaged product 228 containing at least portion of the coconut water 104.

In block 3012, the coconut water storage sources can be the oxygen free collection vessel 218. For disclosure purposes the coconut water storage sources and the oxygen free collection vessel can be the same and are labeled 218.

In block 3014 and with reference to at least FIG. 1A, the self sealing probe 200 can further comprises a tapered shaft having a pointed end 212 for penetrating the coconut 102, the pointed end blends into a gradually widening portion 214 which forms a pressure fit on entry into the coconut 102 between the outer surface of the gradually widening portion 214 and the shell of the coconut 102. The method then moves to block 3016.

In block 3016 and with reference to at least FIG. 1A, the egress port 248 further comprises at least one of a first opening 204A near the pointed end 212 to receive the coconut water 104 and at least one of a second opening 238 exterior to the coconut which is in fluid communication with the oxygen free collection vessel 218.

Figure 9B:
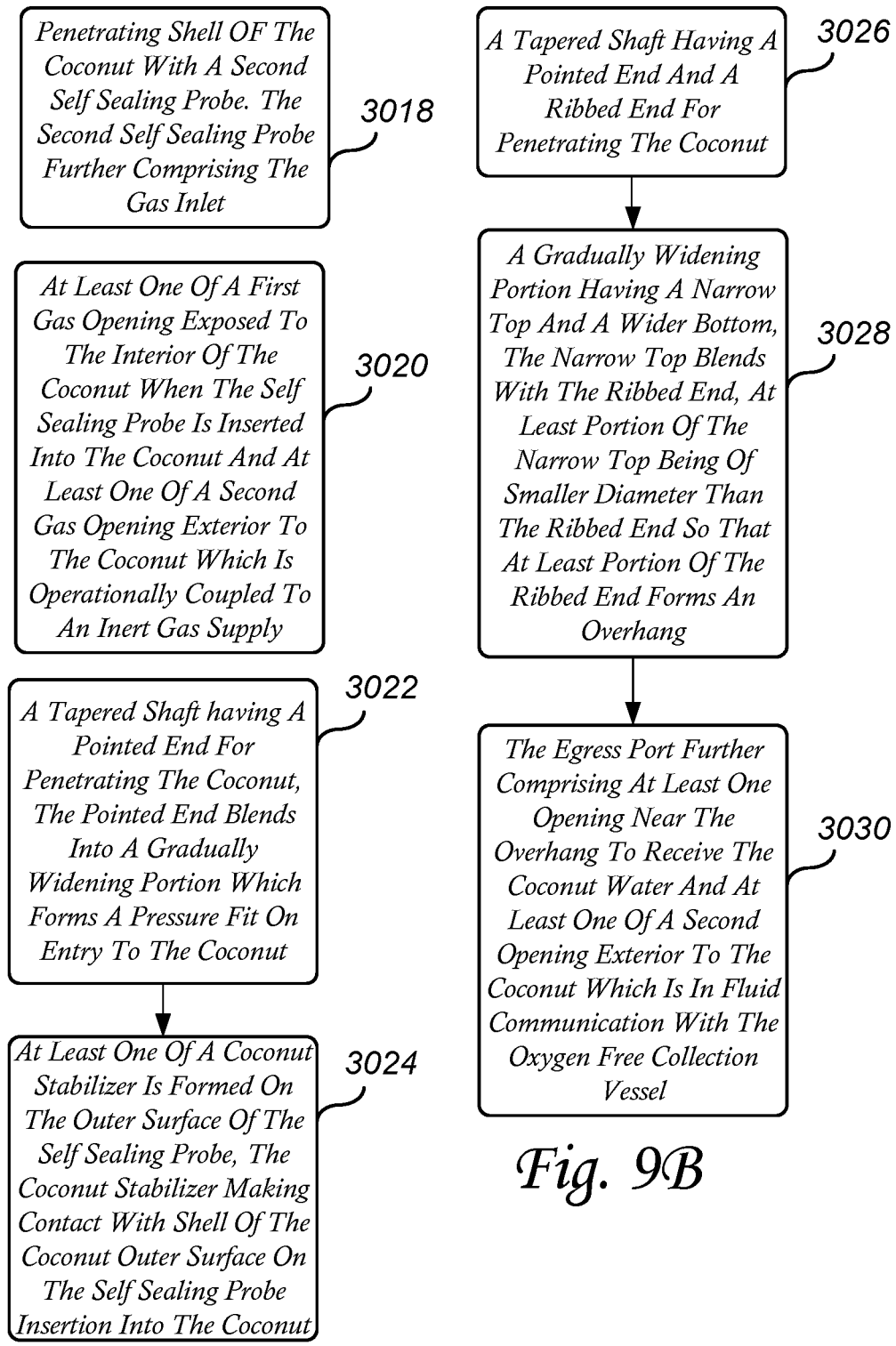

Referring to FIG. 9B there is illustrated exemplary embodiments of a method of preventing oxygen from contacting the coconut water 104 during extraction from a coconut 102.

In block 3018, the shell of a coconut is penetrated with at least one of a self sealing probe 200, the self sealing probe 200 forming a seal between the shell of the coconut 102 and the outer surface of the self sealing probe 200 preventing non-inert gases from ingress into the coconut 102 contacting a coconut water 104 therein and preventing the coconut water 104 from egress along the outer surface of the self sealing probe 200, the self sealing probe 200 further comprising at least one of an egress port 248. In an exemplary embodiment, a mechanical force or other suitable force can be applied to the coconut 102 or to the self sealing probe to cause the self sealing probe 200 to penetrate the coconut 102.

In block 3020 with reference to at least FIGS. 1D and 1E, at least one of a first gas opening 250 is exposed to the interior of the coconut when the self sealing probe 200 is inserted into the coconut 102 and at least one of a second gas opening 252 exterior to the coconut 102 which is operationally coupled to an inert gas supply 222.

In block 3022 and with reference to at least FIG. 1D, a tapered shaft 202 having a pointed end 212 for penetrating the coconut 102, the pointed end 212 blends into a gradually widening portion 214 which forms a pressure fit on entry into the coconut 102 between outer surface of the gradually widening portion 214 and the shell of the coconut 102. The method moves to block 3024.

In block 3024 and with reference to at least FIG. 1D, at least one of a coconut stabilizer 216 (216A and 216B in at least FIG. 1D) is formed on the outer surface of the self sealing probe 200. The coconut stabilizer 216 making contact with the shell of the coconut 102 outer surface when the self sealing probe 200 is inserted into the coconut 102, wherein the coconut stabilizer 216 mitigates the coconut 102 movement and improves the integrity of the seal between shell of the coconut 120 and the outer surface of the self sealing probe 200 during extraction of the coconut water 104.

In block 3026 with reference to at least FIG. 1B, a tapered shaft 202 having a pointed end 212 and a ribbed end 244 for penetrating the coconut 102. The method moves to block 3028.

In block 3028 with reference to at least FIG. 1B, a gradually widening portion 214 having a narrow top and a wider bottom, the narrow top blends with the ribbed end 242, at least portion of the narrow top being of smaller diameter than the ribbed end 242 so that at least portion of the ribbed end 242 forms an overhang 244, the wider bottom is larger in diameter than the ribbed end 242, the gradually widening portion forms a pressure fit on entry into the coconut 102 between outer surface of the gradually widening portion 214 and shell of the coconut 102. The method continues in block 3030.

In block 3030 with reference to at least FIG. 1B, the egress port 248 further comprises at least one of a first opening 204A near the overhang 244 to receive the coconut water 104 and at least one of a second opening 238 exterior to the coconut 102 which is in fluid communication with the oxygen free collection vessel 218, the overhang 244 minimizing material from the shell of the coconut 102 from clogging the first opening 204A during insertion of the self sealing probe 200 into the coconut 102.

Referring to FIG. 9C there is illustrated exemplary embodiments of a method of preventing oxygen from contacting the coconut water 104 during extraction from a coconut 102.

In block 3032 and with reference to at least FIG. 1C, the self sealing probe 200 further comprises a shaft 246 having a pointed end 212 for penetrating the coconut 102, the pointed end 212 blends into a plurality of concentric ribs 208 of increasing diameter which forms a pressure fit on entry into the coconut 102 between the outer surface of the plurality of concentric ribs 208 and the shell of the coconut 102. The method continues in block 3034.

In block 3034 and with reference to at least FIG. 1C, the egress port 248 further comprising at least one of a first opening 204A near the pointed end 212 which receives the coconut water 104 and at least one of a second opening 238 exterior to the coconut 102 which is in fluid communication with the oxygen free collection vessel 218.

Referring to FIG. 10 there is illustrated one example of a method of preventing oxygen from contacting coconut water 104 during processing and packaging of the coconut water 104. In an exemplary embodiment, an inert trusted environment 254 created with inert gas 106 is established around at least one of the transfer and processing equipment. At least a portion of the coconut water 104 is then transferred, within the inert trusted environment 254, from an oxygen free storage source 218 through a filtering system 224, through a filler 226, and then dispensed from the filler 226 into packaging 228.

Such an inert trusted transfer environment 254 can be created by wrapping a piece of equipment and injecting the inert gas 106 between the equipment and wrap layer. It can also be created by placing equipment in an enclosed area and injecting the inert gas 106 into the closed area displacing oxygen that is present. It can also be created by dosing package 228 and other vessels to displace the oxygen inside, replacing with the inert gas 106 creating an inert trusted transfer environment within the package 228. At least FIGS. 5 and 6 illustrate this by placing a boundary around the equipment and showing an inert gas 106 environment around the equipment. The method begins in block 4002.

In block 4002, an inert trusted transfer environment is established which entraps certain of the coconut water transfer and processing equipment (as example and not a limitation at least one of but not limited to 200, 218, 224, 226, 230, 232, 234, 236 package 228) in an inert atmospheric encasement created by inert gas 106, preventing non-inert gas from making contact with the coconut water 104 during transfer and processing from a coconut water storage source 218 to a packaged product 228. The product package 228 containing at least a portion of the coconut water. The method moves to block 4004.

In block 4004, the coconut water 104 is transferred, within the inert atmospheric encasement created by inert gas 106, from a coconut water storage source 218 though a cold filter system 224, wherein the cold filter system makes the coconut water sterile and safe for human consumption. The method moves to block 4006.

In block 4006, the coconut water 104 is transferred, within the inert atmospheric encasement created by inert gas 106, from the cold filter system 224 to a filler 226. The method moves to block 4008.

In block 4008, the coconut water is dispensed by way of the filler 226, within the inert atmospheric encasement, into at least one of a packaged product 228 and sealing the packaged product 228, wherein the coconut water is prevented from contacting non-inert gas during transfer and processing from the coconut water storage source 218 to the packaged product 228. The packaged product 228 containing at least a portion of the coconut water 104. The method is then exited.

Figure 11:
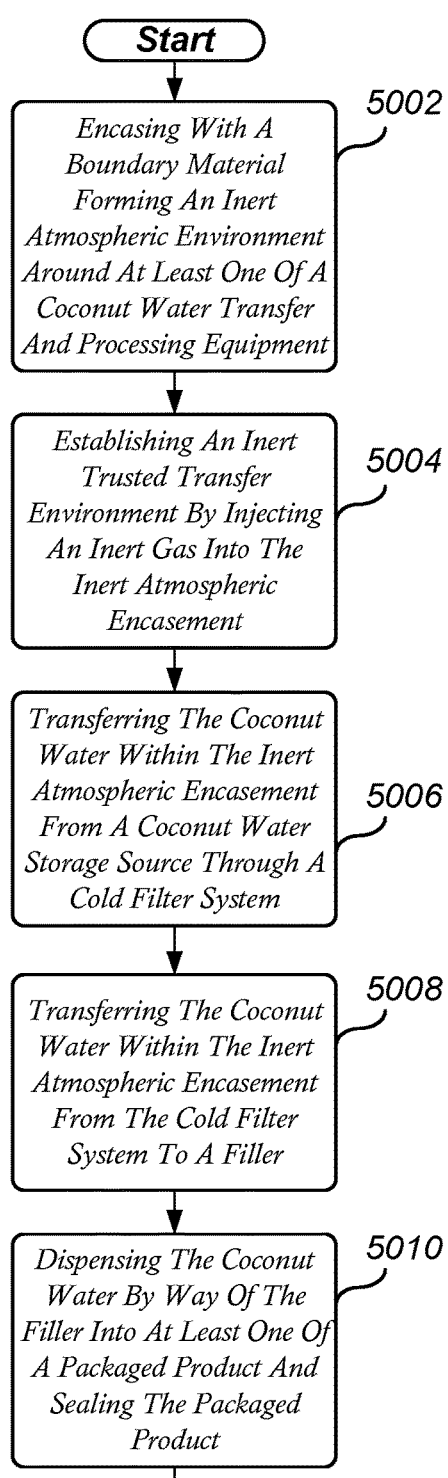

Referring to FIG. 11 there is illustrated one example of a method of preventing oxygen from contacting coconut water 104 during processing and packaging of the coconut water 104. In an exemplary embodiment, at least one piece of coconut water transfer and processing can be encased with a boundary material. Once encased inert gas can be injected to create an inert trusted transfer environment. The coconut water can then be transferred through the transfer and processing equipment, certain of which are, within the inert trusted transfer environment 254, and dispensed into a package 228.

Such boundary material can include for example and not a limitation, tapes and wraps, glass, plastic, other panel enclosure materials, and other boundary materials, as may be required and/or desired in a particular embodiment. The method begins in block 5002.

In block 5002, a boundary material encases and forms an inert atmospheric environment around at least one of a coconut water transfer and processing equipment. The method moves to block 5004.

In block 5004, an inert trusted transfer environment 254 is established which encases and entraps certain of the coconut water transfer and processing equipment (as example and not a limitation at least one of but not limited to 200, 218, 224, 226, 230, 232, 234, 236 package 228) in an inert atmospheric encasement created by inert gas 106. The non-inert gas is prevented from making contact with the coconut water 104 during transfer and processing from a coconut water oxygen free storage source 218 to a packaged product 228 containing at least portion of the coconut water. The method moves to block 5006.

In block 5006, the coconut water 104 is transferred, within the inert atmospheric encasement created by inert gas 106, from a coconut water storage source 218 though a cold filter system 224, wherein the cold filter system making the coconut water sterile and safe for human consumption. The method moves to block 5008.

In block 5008, the coconut water 104 is transferred, within the inert atmospheric encasement created by inert gas 106, from the cold filter system 224 to a filler 226. The method moves to block 5010.

In block 5010, the coconut water is dispensed by way of the filler 226, within the inert atmospheric encasement, into at least one of a packaged product 228 and sealing the packaged product 228, wherein the coconut water is prevented from contacting non-inert gas during transfer and processing from the coconut water storage source 218 to the packaged product 228. The packaged product 228 containing at least a portion of the coconut water 104. The method is then exited.

Figure 12:
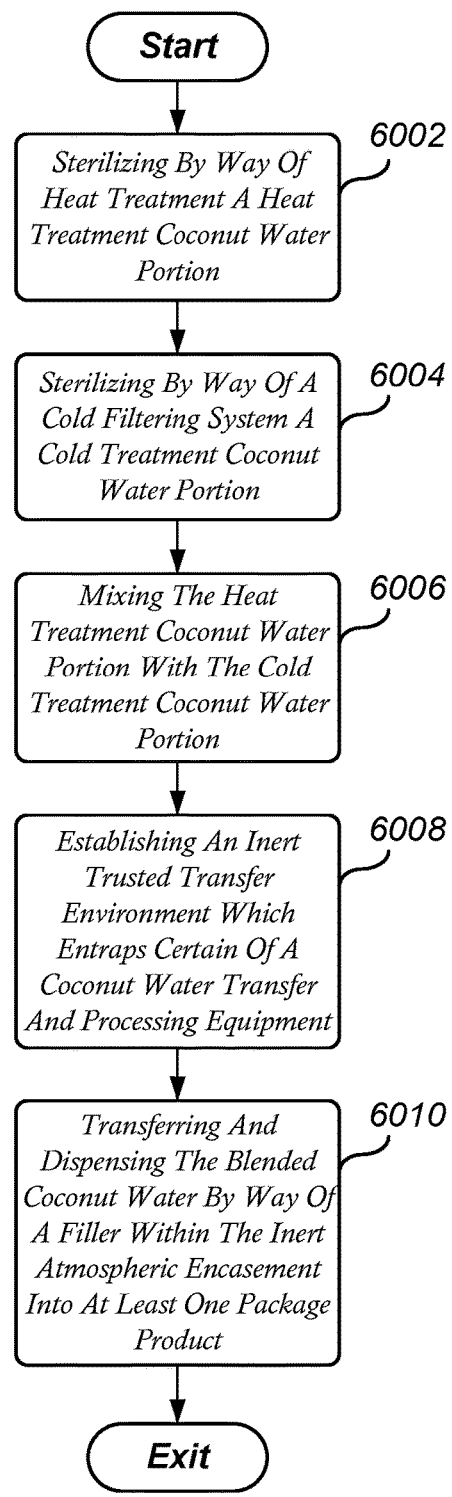

Referring to FIG. 12 there is illustrated one example of a method of preventing oxygen from contacting coconut water 104 during processing and packaging of the coconut water 104. In an exemplary embodiment, a heat treatment coconut water 104 portion can be sterilized by way of heat treatment 230. The heat treatment coconut water 104 portion can then be mixed with the coconut water processed by way of the cold filter system 224. In this regard, a plurality of desirable organic compounds that were removed from the coconut water 104 when passed through the cold filter system 224 is restored to the coconut water 104 by way of the (unfiltered) heat treatment sterile coconut water portion. In an exemplary embodiment, the plurality of useful compounds can include amino acids, nutrients, and other useful organic compounds.

To elaborate, microfiltration by way of filtration system 224 can stripe everything larger than the filter pore size, as example in the range of 0.2 microns. While making the coconut water 104 sterile by removing the biological pathogens, the small pore size can also remove some of the useful organic compounds from the coconut water. To restore the useful compounds a portion of coconut water 104 is heat treated to sterilize by way of heat treatment system 230. Additional post process 232 can be used as necessary such as cooling or temporarily storing the heat treated portion or other post process, as may be required and/or desired in a particular embodiment. The method begins in block 6002.

In block 6002, by way of heat treatment a heat treatment coconut water portion which comprises a plurality of desirable organic compounds can be sterilized. The method moves to block 6004.

In block 6004, by way of a cold filtering system a cold treatment coconut water portion can be sterilized. Such filtering also removes a plurality of desirable organic compounds from the coconut water. The method moves to block 6006.

In block 6006, the heat treatment coconut water portion is mixed with the cold treatment coconut water portion forming a blended coconut water which comprises the plurality of desirable organic compounds. The method moves to block 6008.

In block 6008, an inert trusted transfer environment is established which encases and entraps certain of the coconut water transfer and processing equipment (as example and not a limitation at least one of but not limited to 200, 218, 224, 226, 230, 232, 234, 236 package 228) in an inert atmospheric encasement created by inert gas 106, preventing non-inert gas contact with the coconut water 104 during transfer and processing from a coconut water storage source 218 to a packaged product 228 containing at least portion of the coconut water. The method moves to block 6010.

In block 6010, the blended coconut water is transferred and dispensed by way of a filler 226, within the inert atmospheric encasement created by inert gas 106, into at least one of a packaged product 228, wherein the blended coconut water is prevented from contacting non-inert gas during transfer, processing, packaging, the packaged product, the packaged product containing at least portion of the blended coconut water.

Figure 13:
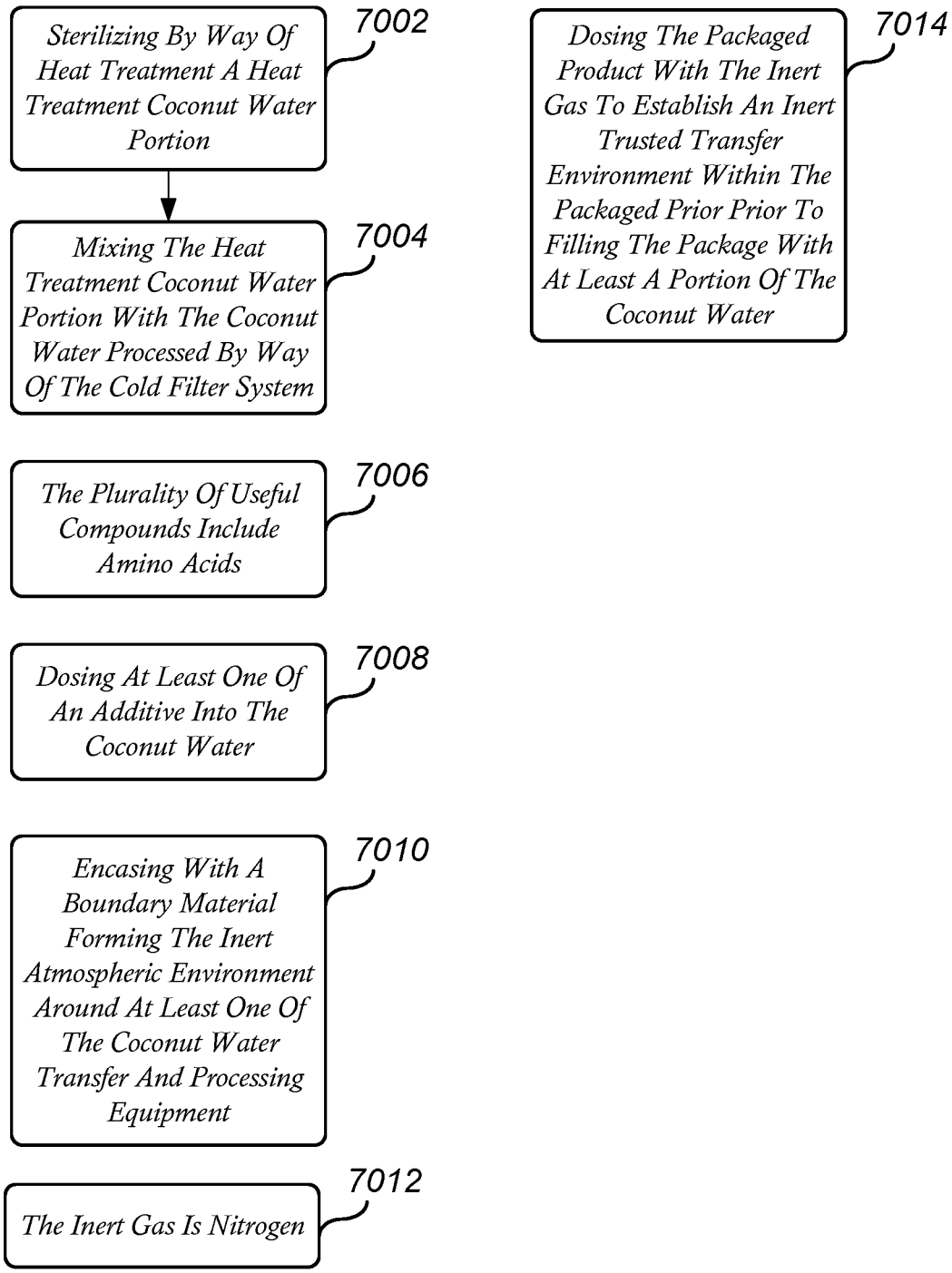

Referring to FIG. 13 there are illustrated exemplary embodiments of a method of preventing oxygen from contacting coconut water 104 during processing and packaging of the coconut water 104.

In block 7002, by way of a cold filtering system a cold treatment coconut water portion can be sterilized. Such filtering also removes a plurality of desirable organic compounds from the coconut water. The method moves to block 7004.

In block 7004, the heat treatment coconut water portion is mixed with the cold treatment coconut water portion forming a blended coconut water which comprises the plurality of desirable organic compounds.

In block 7006, in an exemplary embodiment, the plurality of useful compounds can include amino acids.

In block 7008, in another exemplary embodiment, at least one of an additive can be dosed by way of doser 236 into the coconut water 104. In this regard, flavor, color, nutrients, nutraceuticals, and other additives, as may be required and/or desired can be dosed into the coconut water 104.

In block 7010, a boundary material encases and forms an inert atmospheric environment around at least one of the coconut water transfer and processing equipment.

In block 7012, the inert gas can be nitrogen.

In block 7014, the packaged product can be dosed with the inert gas to establish an inert trusted transfer environment within the packaged product 228 prior to filling the packaged product 228 with at least a portion of the coconut water 104. In an exemplary embodiment and with reference to at least FIGS. 5 and 6, the product package 28 can be dosed with the inert gas 106 prior to filling so that any oxygen present in the product package 228 is displaced exiting the product package 228 before filling. In this regard, avoiding ingress of oxygen into the coconut water 104 and/or the transfer and processing equipment during transfer, processing, and filling including filling by way of filler 226.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of preventing oxygen from contacting coconut water during extraction from a coconut, the method comprising the steps of:
   penetrating shell of a coconut with at least one of a self sealing probe, the self sealing probe forming a seal between shell of the coconut and the outer surface of the self sealing probe preventing non-inert gases from ingress into the coconut contacting a coconut water therein and preventing the coconut water from egress along the outer surface of the self sealing probe, the self sealing probe further comprising at least one of an egress port;
   modifying an atmospheric condition within the coconut by providing an inert gas by way of an inert gas source at predetermined atmospheric pressure through a gas inlet into the coconut, the atmospheric condition being selected to engender flow of the coconut water through the egress port; and
   transferring the coconut water from the coconut by way of the egress port traversing the interior of the self sealing probe into an oxygen free collection vessel.

2. The method in accordance with claim 1, further comprising the step of:
   penetrating shell of the coconut with a second self sealing probe, the second self sealing probe further comprising the gas inlet.

3. The method in accordance with claim 1, the self sealing probe further comprising the gas inlet.

4. The method in accordance with claim 1, wherein the inert gas is provided by way of the gas inlet into the interior of the coconut through the egress port.

5. The method in accordance with claim 1, wherein the step of transferring further comprising:
   transferring the coconut water from the egress port through an inert transfer environment which entraps certain of the coconut water transfer and processing equipment in an inert atmospheric encasement, preventing non-inert gas contact with the coconut water during transport to the oxygen free collection vessel.

6. The method in accordance with claim 1, further comprising the step of:
   establishing an inert transfer environment which entraps certain of the coconut water transfer and processing equipment in an inert atmospheric encasement, preventing non-inert gas contact with the coconut water during transfer and processing from a coconut water storage source to a packaged product, the packaged product containing at least portion of the coconut water.

7. The method in accordance with claim 1, further comprising:
   dosing the packaged product with the inert gas to establish an inert transfer environment within the packaged product prior to filling the packaged product with at least portion of the coconut water.

8. The method in accordance with claim 1, the self sealing probe further comprising:
   a tapered shaft having a pointed end for penetrating the coconut, the pointed end blends into a gradually widening portion which forms a pressure fit on entry into the coconut between outer surface of the gradually widening portion and shell of the coconut; and
   the egress port further comprising at least one of a first opening near the pointed end to receive the coconut water and at least one of a second opening exterior to the coconut which is in fluid communication with the oxygen free collection vessel.

9. The method in accordance with claim 1, the gas inlet probe further comprising:

at least one of a first gas opening is exposed to the interior of the coconut when the self sealing probe is inserted into the coconut and at least one of a second gas opening exterior to the coconut which is operationally coupled to an inert gas supply.

10. The method in accordance with claim 1, the self sealing probe further comprising:

a tapered shaft having a pointed end and a ribbed end for penetrating the coconut;

a gradually widening portion having a narrow top and a wider bottom, the narrow top blends with the ribbed end, at least portion of the narrow top being of smaller diameter than the ribbed end so that at least portion of the ribbed end forms an overhang, the wider bottom is larger in diameter than the ribbed end, the gradually widening portion forms a pressure fit on entry into the coconut between outer surface of the gradually widening portion and shell of the coconut; and the egress port further comprising at least one of a first opening near the overhang to receive the coconut water and at least one of a second opening exterior to the coconut which is in fluid communication with the oxygen free collection vessel, the overhang minimizing material from shell of the coconut from clogging the first opening during insertion of the self sealing probe into the coconut.

11. The method in accordance with claim 1, the self sealing probe further comprising:

a tapered shaft having a pointed end for penetrating the coconut, the pointed end blends into a gradually widening portion which forms a pressure fit on entry into the coconut between outer surface of the gradually widening portion and shell of the coconut; and at least one of a coconut stabilizer is formed on outer surface of the self sealing probe, the coconut stabilizer making contact with shell of the coconut outer surface when the self sealing probe is inserted into the coconut, wherein the coconut stabilizer minimizes the coconut movement and improves the integrity of the seal between shell of the coconut and outer surface of the self sealing probe during extraction of the coconut water.

12. The method in accordance with claim 1, the self sealing probe further comprising:

a shaft having a pointed end for penetrating the coconut, the pointed end blends into a plurality of concentric ribs of increasing diameter which forms a pressure fit on entry into the coconut between outer surface of the plurality of concentric ribs and shell of the coconut; and the egress port further comprising at least one of a first opening near the pointed end which receives the coconut water and at least one of a second opening exterior to the coconut which is in fluid communication with the oxygen free collection vessel.

13. A method of preventing oxygen from contacting coconut water during extraction from a coconut, the method comprising the steps of:

penetrating shell of a coconut with at least one of a self sealing probe, the self sealing probe forming a seal between shell of the coconut and outer surface of the self sealing probe preventing non-inert gases from ingress into the coconut contacting a coconut water therein and preventing the coconut water from egress along outer surface of the self sealing probe, the self sealing probe further comprising an egress port;

penetrating shell of the coconut with a second self sealing probe, the second self sealing probe further comprising a gas inlet;

modifying an atmospheric condition within the coconut by providing an inert gas by way of an inert gas source at predetermined atmospheric pressure through the gas inlet, the atmospheric condition being selected to engender flow of the coconut water through the egress port; and transferring the coconut water from the coconut by way of the egress port traversing the interior of the self sealing probe into an oxygen free collection vessel.

14. The method in accordance with claim 13, wherein the step of transferring further comprising:

transferring the coconut water from the egress port through an inert transfer environment which entraps certain of the coconut water transfer and processing equipment in an inert atmospheric encasement, preventing non-inert gas contact with the coconut water during transport to the oxygen free collection vessel.

15. The method in accordance with claim 13, further comprising the step of:

establishing an inert transfer environment which entraps certain of the coconut water transfer and processing equipment in an inert atmospheric encasement, preventing non-inert gas contact with the coconut water during transfer and processing from a coconut water storage source to a packaged product containing at least portion of the coconut water.

16. The method in accordance with claim 13, further comprising:

dosing the packaged product with the inert gas to establish an inert transfer environment within the packaged product prior to filling the packaged product with at least portion of the coconut water.

17. The method in accordance with claim 13, the self sealing probe further comprising:

a tapered shaft having a pointed end for penetrating the coconut, the pointed end blends into a gradually widening portion which forms a pressure fit on entry into the coconut between outer surface of the gradually widening portion and shell of the coconut; and the egress port further comprising at least one of a first opening near the pointed end to receive the coconut water and at least one of a second opening exterior to the coconut which is in fluid communication with the oxygen free collection vessel.

18. The method in accordance with claim 13, the gas inlet further comprising:

at least one of a first gas opening is exposed to the interior of the coconut when the self sealing probe is inserted into the coconut and at least one of a second gas opening exterior to the coconut which is operationally coupled to an inert gas supply.

19. The method in accordance with claim 13, the self sealing probe further comprising:

a tapered shaft having a pointed end and a ribbed end for penetrating the coconut;

a gradually widening portion having a narrow top and a wider bottom, the narrow top blends with the ribbed end, at least portion of the narrow top being of smaller diameter than the ribbed end so that at least portion of the ribbed end forms an overhang, the wider bottom is larger in diameter than the ribbed end, the gradually widening portion forms a pressure fit on entry into the coconut between outer surface of the gradually widening portion and shell of the coconut; and the egress port further comprising at least one of a first opening near the overhang to receive the coconut water and at least one of a second opening exterior to the coconut which is in fluid communication with the oxygen free collection vessel, the overhang minimizing material from shell of the coconut from clogging the first opening during insertion of the self sealing probe into the coconut.

20. The method in accordance with claim 13, the self sealing probe further comprising:

a tapered shaft having a pointed end for penetrating the coconut, the pointed end blends into a gradually widening portion which forms a pressure fit on entry into the coconut between outer surface of the gradually widening portion and shell of the coconut; and at least one of a coconut stabilizer is formed on outer surface of the self sealing probe, the coconut stabilizer making contact with shell of the coconut outer surface when the self sealing probe is inserted into the coconut, wherein the coconut stabilizer minimizes the coconut movement and improves the integrity of the seal between shell of the coconut and outer surface of the self sealing probe during extraction of the coconut water.

21. The method in accordance with claim 13, the self sealing probe further comprising:

a shaft having a pointed end for penetrating the coconut, the pointed end blends into a plurality of concentric ribs of increasing diameter which forms a pressure fit on entry into the coconut between outer surface of the plurality of concentric ribs and shell of the coconut; and the egress port having a first opening near the pointed end to receive the coconut water and a second opening exterior to the coconut which is in fluid communication with the oxygen free collection vessel.

22. A system of preventing oxygen from contacting coconut water during extraction from a coconut, the system comprising:

an oxygen free collection vessel; and at least one of a self sealing probe penetrates shell of a coconut, the self sealing probe further comprising:

a tapered shaft having a pointed end for penetrating the coconut, the pointed end blends into a gradually widening portion which forms a pressure fit on entry into the coconut between outer surface of the gradually widening portion and shell of the coconut, the self sealing probe forms a seal between shell of the coconut and the outer surface of the self sealing probe preventing non-inert gases from ingress into the coconut contacting a coconut water therein and preventing the coconut water from egress along the outer surface of the self sealing probe; and an egress port having a first opening near the pointed end receives the coconut water and a second opening exterior to the coconut which is in fluid communication with the oxygen free collection vessel, the coconut water traversing the interior of the self sealing probe.

23. The system in accordance with claim 22, further comprising:

a gas inlet provides an inert gas by way of an inert gas source which modifies an atmospheric condition within the coconut to at predetermined atmospheric pressure, the atmospheric condition being selected to engender flow of the coconut water from the coconut through interior of the egress port into the oxygen free collection vessel protecting the coconut water from exposure to non-inert gases.

24. The system in accordance with claim 22, further comprising:

at least one of a coconut stabilizer is formed on outer surface of the self sealing probe, the coconut stabilizer making contact with shell of the coconut outer surface when the self sealing probe is inserted into the coconut, wherein the coconut stabilizer minimizes the coconut movement and improves the integrity of the seal between shell of the coconut and outer surface of the self sealing probe during extraction of the coconut water, wherein the coconut water extracted exits from the coconut and is transferred to the oxygen free collection vessel preventing exposure to non-inert gases.

25. The system in accordance with claim 22, further comprising:

at least one of a second self sealing probe penetrates shell of the coconut, the second self sealing probe further comprising:

at least one of a gas inlet modifies an atmospheric condition within the coconut by providing an inert gas source at predetermined atmospheric pressure, the atmospheric condition being selected to engender flow of the coconut water from the coconut through interior of the egress port into the oxygen free collection vessel protecting the coconut water from exposure to non-inert gases.

26. A system of preventing oxygen from contacting coconut water during extraction from a coconut, the system comprising:

an oxygen free collection vessel; and at least one of a self sealing probe penetrates shell of a coconut, the self sealing probe further comprising:

a tapered shaft having a pointed end and a ribbed end for penetrating the coconut;

a gradually widening portion having a narrow top and a wider bottom, the narrow top blends with the ribbed end, at least portion of the narrow top being of smaller diameter than the ribbed end so that at least portion of the ribbed end forms an overhang, the wider bottom is larger in diameter than the ribbed end, the gradually widening portion forms a pressure fit on entry into the coconut between outer surface of the gradually widening portion and shell of the coconut; and an egress port further comprising at least one of a first opening near the overhang which receives the coconut water and at least one of a second opening exterior to the coconut which is in fluid communication with the oxygen free collection vessel, the overhang minimizing material from shell of the coconut from clogging the first opening during insertion of the self sealing probe into the coconut, wherein the coconut water extracted exits from the coconut through the egress port traversing the interior of the self sealing probe and is transferred to the oxygen free collection vessel preventing exposure to non-inert gases.

27. The system in accordance with claim 26, further comprising:

at least one of a second self sealing probe penetrates shell of the coconut, the second self sealing probe further comprising:

at least one of a gas inlet modifies an atmospheric condition within the coconut by providing an inert gas source at predetermined atmospheric pressure, the atmospheric condition being selected to engender flow of the coconut water from the coconut through interior of the egress port into the oxygen free collection vessel protecting the coconut water from exposure to non-inert gases.

28. The system in accordance with claim 27, further comprising:
at least one of a coconut stabilizer is formed on outer surface of the self sealing probe, the coconut stabilizer making contact with shell of the coconut outer surface when the self sealing probe is inserted into the coconut, wherein the coconut stabilizer minimizes the coconut movement and improves the integrity of the seal between shell of the coconut and outer surface of the self sealing probe during extraction of the coconut water, wherein the coconut water extracted exits from the coconut and is transferred to the oxygen free collection vessel preventing exposure to non-inert gases.

29. A system of preventing oxygen from contacting coconut water during extraction from a coconut, the system comprising:
an oxygen free collection vessel; and
at least one of a self sealing probe penetrates shell of a coconut, the self sealing probe further comprising:
a shaft having a pointed end for penetrating the coconut, the pointed end blends into a plurality of concentric ribs of increasing diameter which forms a pressure fit on entry into the coconut between outer surface of the plurality of concentric ribs and shell of the coconut; and
an egress port further comprising at least one of a first opening near the pointed end which receives the coconut water and at least one of a second opening exterior to the coconut which is in fluid communication with the oxygen free collection vessel, the coconut water traversing the interior of the self sealing probe.

30. The system in accordance with claim 29, further comprising:
at least one of a second self sealing probe penetrates shell of the coconut, the second self sealing probe further comprising:
at least one of a gas inlet modifies an atmospheric condition within the coconut by providing an inert gas source at predetermined atmospheric pressure, the atmospheric condition being selected to engender flow of the coconut water from the coconut through interior of the egress port into the oxygen free collection vessel protecting the coconut water from exposure to non-inert gases.

* * * * *